April 29, 1952
L. DEWAN
2,595,189
RHEOSTAT POTENTIOMETER
Filed March 31, 1950
4 Sheets-Sheet 1
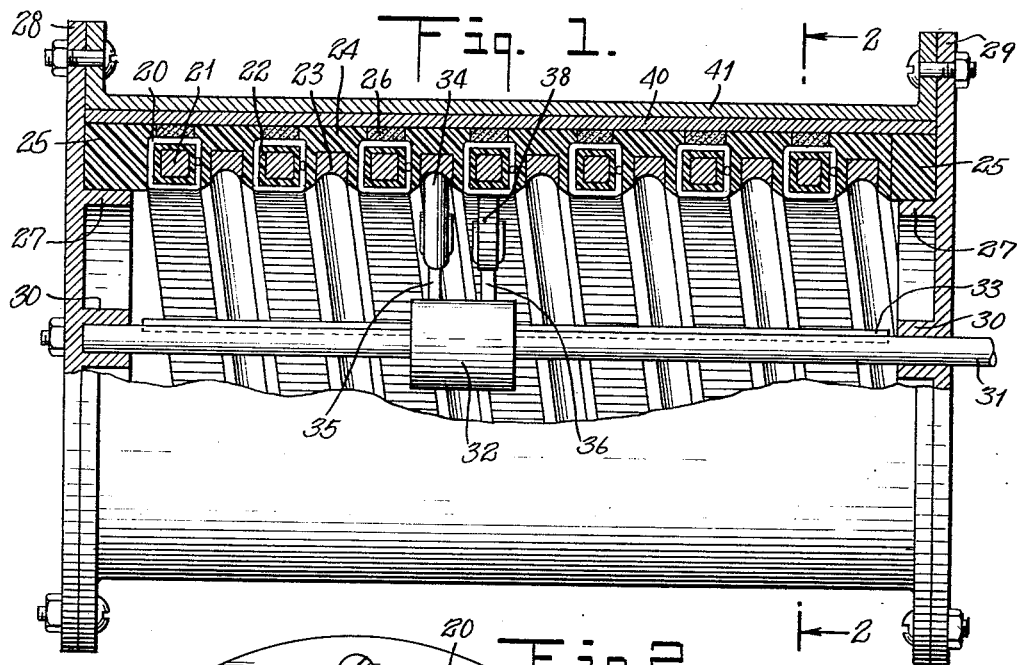
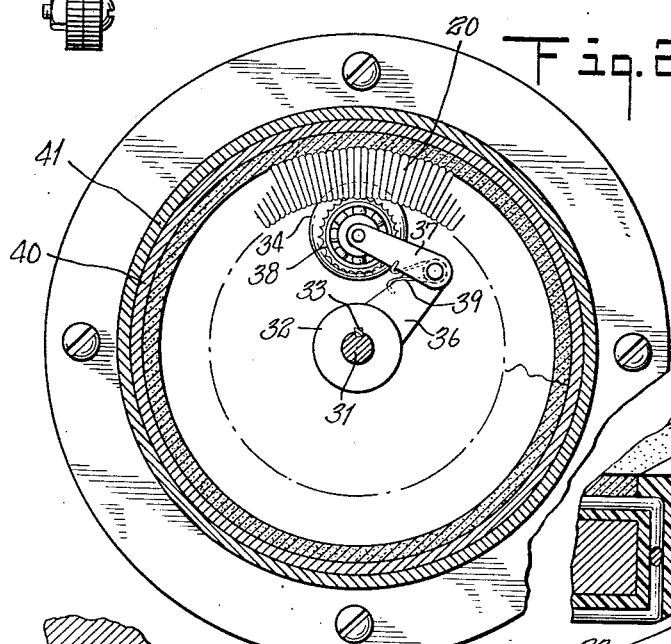
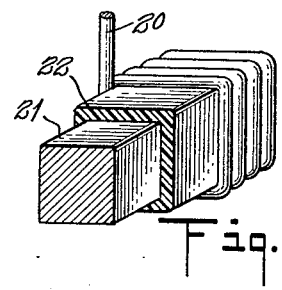
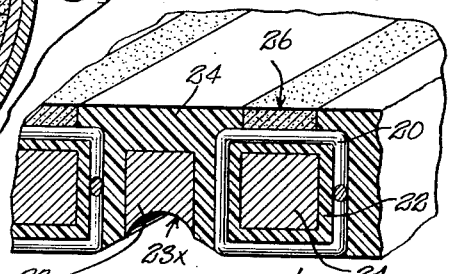
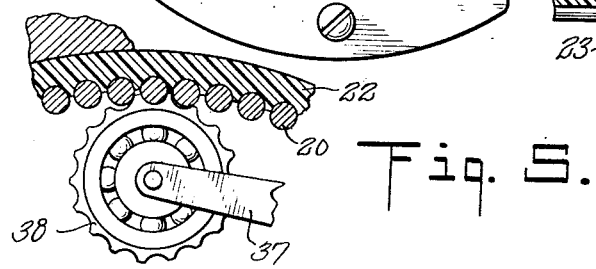
INVENTOR.
LEON DEWAN
BY
Edw. J. Higgins
ATTORNEY April 29, 1952          L. DEWAN          2,595,189
RHEOSTAT POTENTIOMETER
Filed March 31, 1950          4 Sheets-Sheet 2
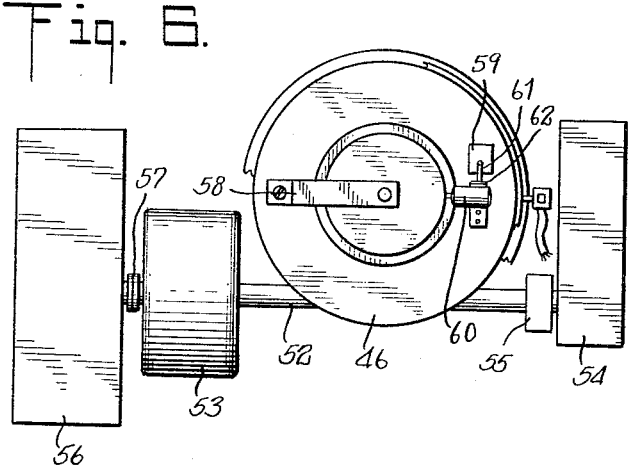
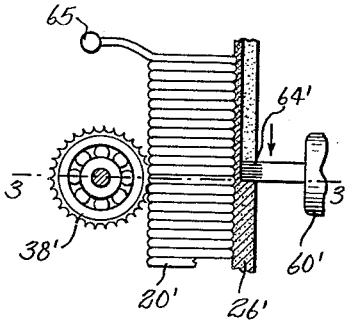
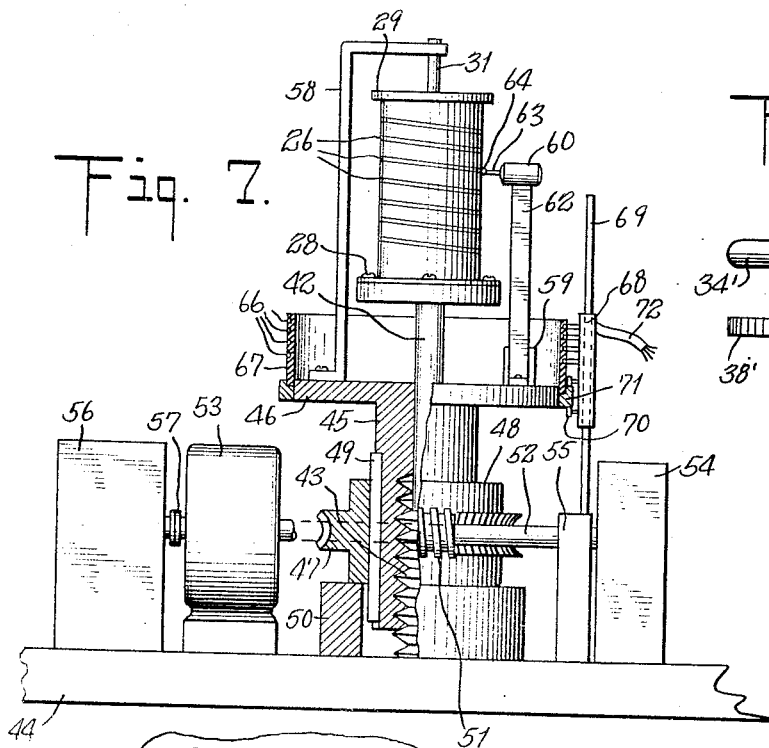
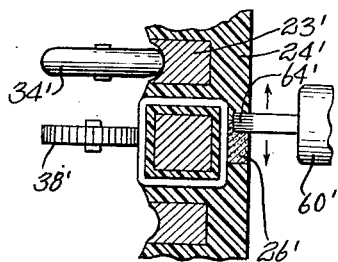
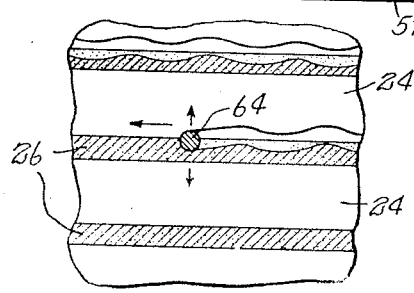
INVENTOR.
LEON DEWAN
BY
Edw. S. Higgins
ATTORNEY April 29, 1952      L. DEWAN      2,595,189
RHEOSTAT POTENTIOMETER Filed March 31, 1950      4 Sheets-Sheet 3

INVENTOR.
LEON DEWAN
BY
Edw. S. Higgins
ATTORNEY

April 29, 1952  L. DEWAN  2,595,189
RHEOSTAT POTENTIOMETER
Filed March 31, 1950  4 Sheets-Sheet 4
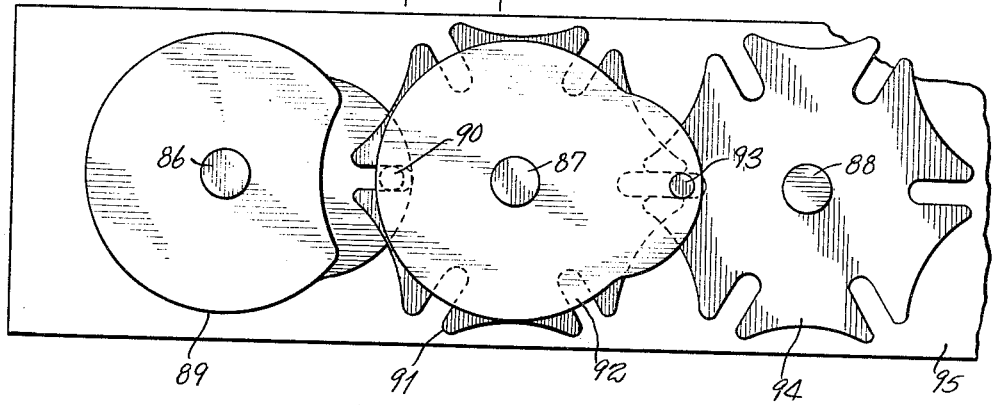
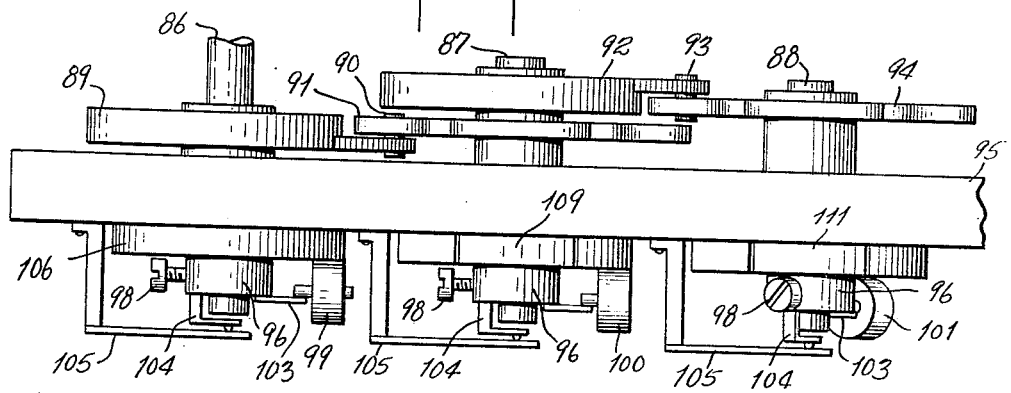
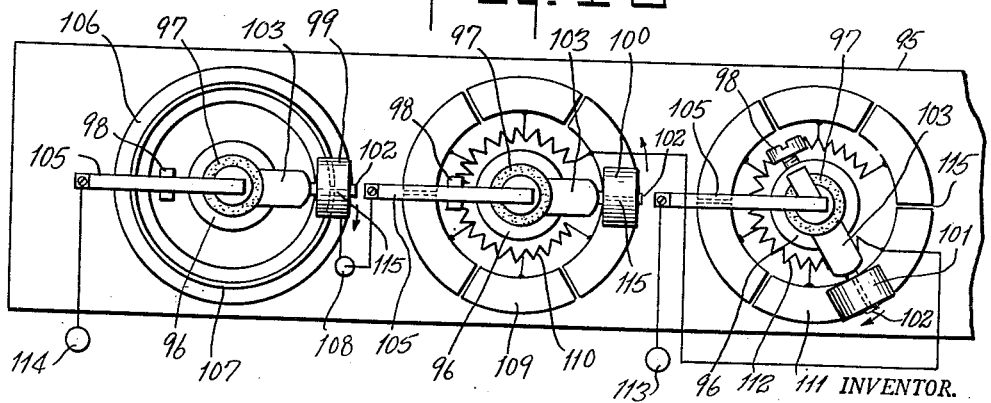
INVENTOR.
LEON DEWAN
BY
Edw. S. Higgins
ATTORNEY

Patented Apr. 29, 1952

2,595,189

UNITED STATES PATENT OFFICE 2,595,189

RHEOSTAT POTENTIOMETER

Leon Dewan, New York, N. Y., assignor of one-third to Milton H. Feig, Brooklyn, N. Y., and one-third to Frederick E. Hettling, Queens, N. Y.

Application March 31, 1950, Serial No. 153,226

8 Claims. (Cl. 201—56)

This invention relates to an electrical resistance device and more particularly to a resistor which is slidably contacted to produce a rheostat or potentiometer. This shall generally be referred to herein as a rheostat.

A prime object of the present invention is to produce such a resistor of highly accurate linearity so that the resistance may vary uniformly in accordance with the movement of the contactor.

Another object is to produce such a resistor with a high accuracy of its total resistance.

Another object is to accomplish the above objects in an automatic manner suitable for the need of commercial production.

Other objects and advantages will appear in the description.

A common form of such a resistor is a helix of resistance wire wound upon a core which itself is twisted into a helical coil to provide a long slide path. In this instrument linear accuracy is an important factor, especially when it is used as a potentiometer in conjunction with modern devices such as servo-controls, etc.

Ordinarily to attain an accurate linearity the core is wound with resistance wire by special methods and the body of the instrument and the parts are precision machined. However, though the wire winding is made linearly accurate, while the core is straight, the twisting of the core into a helix, as well as the slight eccentricity in the body of the instrument and in the contactor assembly and other inaccuracies associated with production finally introduce a certain percentage of non-linearity when the instrument is finally assembled.

According to this invention, the components of the rheostat as well as the winding are made with no particular attempt at great accuracy. When an instrument has been assembled and is in working condition, it is subjected to a special "accuratizing" process that removes all inaccuracies including those in the original winding and the components and those that crept in during the assembly.

The rheostat is so constructed that a longitudinal portion of its winding, facing the outside of the instrument, is exposed and accessible. This portion is then coated with an even layer of a conductive substance of much higher resistance than that of the winding, for example, carbon black or graphite dispersed in a plastic binding agent. This substance increases the conductivity of the winding to an extent commensurate with the expected linear inaccuracy of the instrument. The rheostat is then mounted in an "accuratizing" device in which the contactor of the rheostat is advanced in conjunction with that of a master rheostat of high linear accuracy. Both of these instruments are connected in a servo-control network including a Wheatstone bridge and a servo-motor operated cutter positioned to cut away the conductive substance. As both instruments are advanced, any departure of the rheostat from linearity as compared to the master rheostat unbalances the bridge and causes the servo cutting unit to remove more of the conductive substance which in turn affects the resistance of the winding in such a way as to restore the balance of the bridge. Thus the balance of the bridge constantly tending to be self restored guides the linearity of the rheostat to conform to that of the master rheostat.

Fig. 1 is a front view of the improved rheostat, with part of the front wall cut away to reveal the interior.

Fig. 2 is a cross sectional view taken on the plane of the line 2—2 of Fig. 1.

Fig. 3 is an enlarged fragmentary perspective view of a portion of the winding core of Fig. 1, with part of the winding and plastic coating removed.

Fig. 4 is an enlarged perspective detail view showing a winding and an adjacent separator.

Fig. 5 is an enlarged detail view showing the contactor riding on the wire.

Fig. 6 is an enlarged detail view looking down on top of the accuratizing device.

Fig. 7 is a front view of the device of Fig. 6 with parts being shown in section and parts being cut away.

Fig. 8 is a detail view partly in section and partly in elevation showing the wall of the rheostat of Fig. 7 with its contactor and its relation to the cutter outside.

Fig. 9 is a sectional view of the parts shown in Fig. 8 looking upwardly from the bottom.

Fig. 10 is a plan view of the parts of Fig. 9 turned half way around to view the track on the surface of the rheostat.

Fig. 16 is a plan view showing the mechanism on one side of the master rheostat panel.

Fig. 17 is a bottom plan view of the mechanism of Fig. 16.

Fig. 18 is a bottom plan view of the mechanism of Fig. 17 showing the resistors and switches on the reverse side of the master rheostat panel.

Figure 11:
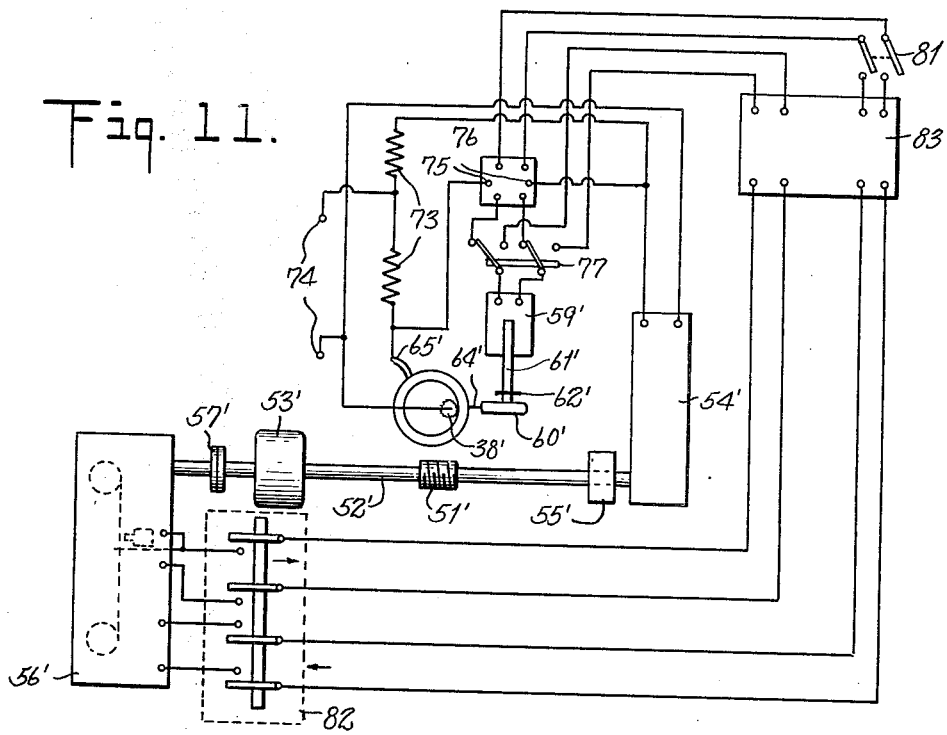
Fig. 11 is a diagrammatic view of the electrical connections of the apparatus of Figs. 6 and 7.

Referring in particular to Figs. 1 to 5, a resistance wire 20 is wound on a core consisting of a central portion 21 of copper or other soft metal, and a plastic coating 22. The winding core is wound on a polished metal mandrel side by side with a separator strip consisting of a metal core 23 having a concave groove on the underside, with a plastic cover 24. The winding core and the separator are cemented together as are the plastic end rings 25. The space on the winding 20 is then filled with a conductive paste, preferably containing carbon black or graphite dispersed in a plastic with solvent for forming the track 26. It is preferred that all the plastic used including the cement have the same solvent to form a unitary structure on drying. The mandrel is then withdrawn and the formed cylinder mounted on the annular projections 27 of the metal end pieces 28 and 29, which also carry the bearings 30 for the shaft 31. This shaft turns the carrier 32 by means of the key 33 fixed in the shaft and sliding in a keyway in the carrier. The roller 34 mounted on a support 35 projecting from the carrier and engaging the groove 23x in the core 23 causes the carrier to slide along the shaft and follow the helical winding when the shaft is turned. On the support 36 projecting from the carrier is hinged the arm 37 carrying a metallic roller 38 having a ball bearing and gear like grooves in its periphery.

The spring 39 on the hinge urges the roller 38 against the winding to act as a contactor. The gear-like grooves on the roller 38 are of such size and spacing as to engage the wires of the winding in gear fashion, more easily seen in Fig. 5. The result is sharp definition and a certain amount of "wipe" for electrical contact with very little of the friction or abrasion that occurs in the case of a solid slide contactor. The torque for turning the shaft is small even when the pressure of the contactor against the winding is ample for positive electrical contact at all times.

When the rheostat has been assembled thus far, it is mounted in an accuratizing device (later described) and processed, after which the cylindrical plastic shell 40 and the flanged metal barrel 41 are put into place and the barrel flanges bolted to the end pieces 28 and 29 as shown.

Figs. 6 to 10 illustrate the accuratizing device. The rheostat minus the plastic shell 40 and the barrel 41 is bolted by means of the end piece 28 to the table top of the upright pillar 42 whose lower portion 43 contains projecting screw threads of the same pitch as the helix of the rheostat. The pillar is fixed in the base 44. A threaded hub 45 with a flanged top 46 engages the screw 43 and slides on the pillar 42. The hub 45 is turned by the worm gear 47 whose hub 48 engages hub 45 through the key 49 which slides in a key way in hub 48. The hub 48 rests on the rim of the cylinder 50 and the worm gear is rotated by the mating screw 51 mounted on the shaft 52 which is rotated by the motor 53. The motor drives a highly accurate master rheostat 54 (described later) through a change gear box 55 and a Poulsen magnetic tape recorder 56 through a clutch 57.

On the flange 46 is mounted the arm 58 which clamps on the shaft 31 of the rheostat to operate it in conjunction with the turning of flange 46. The servo mechanism 59 also mounted on the flange acts to move the small motor 60 bodily in a substantially vertical direction by moving the lever 61 hinged or pivoted on the upright bracket 62. The motor 60 carries a slender shaft 63 with a small abrasive cutter 64 at its end. The cutter is operated in the wall of the cylinder at a depth very close to the surface of the winding 20. As the assembly on flange 46 turns in a helical path due to the screw, the cutter 64 forms a groove that parallels the graphite track 26. As the cutter is actuated vertically by the servo mechanism 59, the groove wavers and cuts to varying extent into the track 26 to vary its width and thereby effect the conductivity of the winding beneath the resultantly modified portion of the track. This is shown more in detail in Figs. 8, 9 and 10 which show top, side and front view, respectively, of the portion of the winding and the graphite track being modified. It will be seen in Fig. 8 that the contactor 38' touches the winding 20', at the same point, approximately, as the edge of the cutter 46 as indicated by the line 3—3. Thus the track is continually modified at a point where the contactor 38 makes electrical connection between it and the active terminal 65 of the rheostat, the other end of the winding being free.

The pillar 42 may be hollow (not shown) to allow wires from the rheostat to lead to outside connections. The electrical connections from the motor and the servo mechanism are led to slip rings 66 mounted on the insulating ring 67. These slip rings are contacted by brushes on the brush assembly 68. This assembly rides on the vertical square rod 69 fixed in the base. The rollers 70 attached to the brush assembly engage the ring 71 and cause the brushes to rise and fall with the flange 46 and keep the brushes contacting the slip rings. The flexible electric cable 72 carries the connections to the electric system.

Referring now to Fig. 11 showing the electrical system, terminal 65 of the rheostat and the contactor are connected in a Wheatstone bridge circuit with the equal balancing resistors 73. Voltage is applied to the bridge at the terminals 74. The balance terminals 75 are connected to the input of the special amplifier 76 whose output may actuate the motor of the servo mechanism 59 through the switch 77. The amplifier 76 converts any unbalance of the bridge into currents whose polarity depends on the direction of unbalance so that the servo mechanism moves the cutter up or down accordingly. This type of amplifier is well known and needs no detailed description. The conditions of the accuratizing process are as follows:

The rheostat is wound to a resistance higher than the resistance finally desired, by a percentage somewhat greater than the expected percentage of linear inaccuracy of the winding. The graphite substance forming the layer is of such resistance (considerably higher than the winding) that it lowers the resistance of the winding to a point not quite as far below the desired resistance value as the winding resistance is above the same.

As an example, for the sake of explanation, if the desired final resistance is 100 ohms per inch of winding and the linear inaccuracy of the winding is ±1%, the winding is made to have a mean resistance of 101 to 102 ohms per inch and the graphite layer which may be approximately 4500 ohms per inch resistance reduces the winding to a mean resistance of approximately 99 ohms or more per inch.

In the first accuratizing process the motor 53 is engaged to drive the mounted rheostat and the master rheostat in unison. The master rheostat would, according to the example given above, increase 100 ohms per every inch that the contactor 38 traverses the rheostat winding. Then when the rheostat is conforming to the ideal linearity of the master rheostat, the cutter 64 would be constantly removing enough of the graphite track to reduce its conductive effect to a half. In practice it is desirable that the track be of greater resistance than the theoretical 4500 ohms given above so that the extent to which the cutter 64 digs into the track under ideal conditions is somewhat less than half of the area of the track as shown by the line 78 in the region 79 of Fig. 12. When the linearity of the rheostat winding 20 departs from the ideal linearity of the master rheostat the bridge is unbalanced and the cutter consequently is moved by the servo mechanism to vary the extent of the cut into the track. As this happens, it changes the conductivity of the winding between the contactor and the terminal 65, this in turn tends to restore the balance of the bridge and prevent the cutter from going any farther until or as the bridge is further unbalanced. Thus as the winding 20 is traversed from one end to the other it is constantly corrected to conform to the linearity of the master rheostat to keep the bridge balanced.

Figure 12:
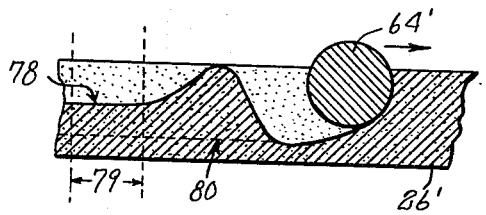
Fig. 12 is a diagrammatic view showing the cutting conditions of the track in the first stage, on an enlarged scale.

In practice, it is preferable that an ample allowance be made for the linear inaccuracy so that the resistance of the wire winding itself would be made 103 ohms or more per inch and the conductivity of the graphite track be made correspondingly greater in relation thereto. Thus the linear inaccuracy would not require that the whole width of the track be modulated for correction but a margin would be left, as indicated in Fig. 12 by the dotted line 80 which represents the limit of the depth required for correction in this case.

In cases where it is an advantage to reduce or eliminate the temperature versus resistance change in the instrument, the proportion of conductivity of the track to the windng may be increased even more than indicated when necessary. Graphite has a high negative temperature coefficient of resistivity, about —.0026. If the winding is made of a resistance wire having a positive coefficient of about +.00014 (this is found for example in the alloy 80 Ni 20 Ch), and if the track is made of such relative conductivity that after accuratizing it represents roughly between 5% and 6% of the total, the proportional value will be such that with a given rise of temperature the track having the greater negative coefficient would cause a decrease of resistance caused by the lesser positive coefficient of the winding. The instrument would thus have a practically constant resistance under any temperature changes in ordinary use since the temperature versus resistance scale of these two conductors is linear for about 200° C. above and below zero.

The first accuratizing process described leaves a slight linear inaccuracy because when the bridge is unbalanced and actuates the cutter to change the winding resistance which in turn tends to restore balance, the action is not instantaneous, there is a certain amount of lag and also a certain amount of under correction since any attempt at perfection could cause the action to overshoot and result in oscillation or instability. To bring the rheostat nearer to perfection the winding is retraversed under the following conditions.

Figure 13:
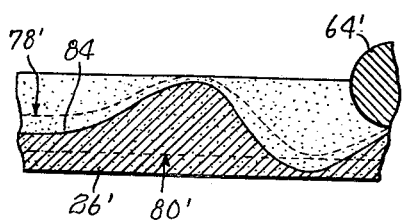
Fig. 13 is a similar view showing the cutting conditions when the track is finally perfected in the second stage.

The switch 81 is closed. Switch 77 is put into midway position to disconnect the servo mechanism. The switch 82 is pulled upward and the clutch 57 is caused to engage the motor 53 to the recorder 56. The output of the balance amplifier 76 now feeds to the input of the amplifier 83 while the output of same connects to the recording input of recorder 56. The motor 53 is reversed. During this retraversal the linear inaccuracy remaining from the first process causes unbalance of the bridge and this unbalance is recorded on the magnetic tape as a modulation, the median line of which corresponds to the zero balance of the bridge. When the traversal is completed, the switch 81 is opened, switch 77 is pulled to the right to connect the output of amplifier 83 to the servo mechanism, and the switch 82 is pulled down to connect the reproducing output of recorder 56 to the input of amplifier 83. The motor 53 is again reversed and the winding retraversed. During this retraversal, the record of the linear inaccuracy is applied to correct the same inaccuracy that produced the record. The output of the amplifier 83 is a modulated D. C. whose median line or strength is of such magnitude as to cause the cutter 64' to press against the track's original median line 78' in Fig. 13 with a pressure sufficient to make a new median line 84. As the modulation departs from median the pressure on the cutter is varied and the depth of the cut is varied accordingly to correct the linear inaccuracy that produced the record.

It may be seen that the linear inaccuracy of a rheostat can be reduced by subjecting it to the second or recording accuratizing process alone whereby the gross inaccuracy is recorded and "played back" to correct itself. However it is difficult to gauge the magnitude of the play back to full accuracy and the change of conductivity of the track with depth of cut is slightly non-linear. It is the combination of the two processes that produces the higher linear accuracy since any shortcoming in the second recording process amounts to only a small percentage of the already small percentage of inaccuracy remaining from the first process. In cases where the accuracy of the total resistance value of the rheostat is of primary importance, the first process alone may be used since the median line in the graphite track then corresponds to the absolute resistance of the master rheostat and the rheostat would then have a very accurate resistance tolerance.

The change gear box 55 allows the master rheostat to function for rheostats of different resistances by varying the rate at which the master rheostat resistance increases per given advance of the contactor on the rheostat. A similar result can be produced by varying the resistance of one of the balance resistors 73 in relation to the other to establish a desired proportion of the bridge. The gearing is desirable for establishing the larger steps in resistance and the latter for the smaller steps and graduated changes produced by varying the resistance of one of the balance resistors 73 in relation to the other to establish a desired proportion of the bridge. The gearing is suitable for obtaining the larger steps in the resistance scale while varying the proportion of resistances 73 can be used to achieve the smaller steps and a fine graduation.

Figure 14:
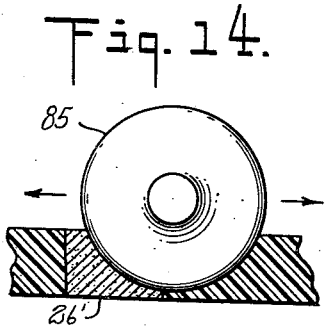
Fig. 14 is an enlarged detail sectional view showing a modified form of cutting instrument and its use.
Figure 15:
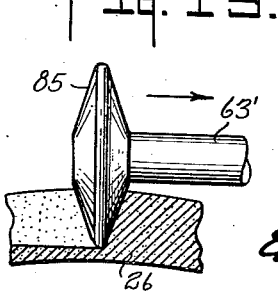
Fig. 15 is a view of Fig. 14 turned half way around.

Figs. 14 and 15 illustrate an alternate type of cutter especially useful where the linear inaccuracy of a winding varies sharply within short distances. The axis of the thin abrasive wheel 85 roughly parallels the length of the track 26' in this case. The shaft 63' is moved by the servo mechanism to cause the wheel to modulate the track as shown by the two arrows in Fig. 14 and thus vary its area. The travel of the wheel relative to the track is indicated by the arrow in Fig. 15. It will be noted that the fine edge of the wheel may sharply define its position and make it possible to correct inaccuracies occurring in a short space.

In Figs. 16, 17 and 18 which are rear, top and front views, respectively, the shaft 86 drives the shafts 87 and 88, respectively, through elements of a Geneva movement so that each revolution of shaft 86 causes shaft 87 to index by one sixth of a turn, and each revolution of shaft 87 causes shaft 88 to index similarly, and so on, the rotation of shaft 86 being continuous. The disk-like member 89 on shaft 86 carries the pin 90 which actuates the slotted wheel 91 by one sector for every revolution of the shaft 86. This type of movement is well known. The member 92 on shaft 87 carries the pin 93 which actuates the slotted wheel 94 similarly.

The shafts turn in bearings in the insulating panel 95 and on the other side of the panel they turn the collars 96 which are insulated from the shafts by rings 97 of plastic material. The rings 97 are bonded to the shafts and screws 98 in the collars 96 maintain the collars securely in position. The contact rollers 99, 100 and 101 are mounted on shafts 102 which are brazed to the thin flexible conductive strips 103 attached to the collars 96. The contact arms 104 coming from the collars 96 contact the conductive arms 105 which act as terminals for the contact rollers.

On panel 95 is mounted an insulating annular projection 106 carrying in a circular groove the resistance wire 107 which forms an almost complete circle, one end of which is connected to the terminal 108. The wire 107 is in constant contact with the roller 99 which is pressed against it by the spring action of the strip 103. The conductive arcuate segments 109 over which the roller 99 rides form parts of a circular switch for the equal segments of the resistance 110. Segments 111 are similarly connected to resistance 112. The resistance of the wire 107 is equal to one of the segments of resistance 110 and the resistance of 110 plus the resistance of wire 107 is equal to one of the segments of resistance 112. The roller 101 is connected to the terminal 113. One end of resistance wire 107 is connected to roller 100 through terminal 108 and one end of resistance 110 is connected to resistance 112 and the roller 99 is connected to terminal 114.

It will thus be seen that as the shaft 86 is driven and the roller 99 travels around that the total resistance between the terminals 113 and 114 will be varied smoothly according to the resistance of the wire 107. As the roller 99 bridges the gap between the ends of the wire 107 (see arrows indicating the rotation of the rollers) the Geneva movement acts and an additional segment of resistance 110 is switched into circuit. As the roller 100 straddles those of segments 109 which connect to the ends of resistance 110 an additional segment of resistance 112 is switched into circuit thus maintaining the progressive change of the total resistance. In the drawings, the rheostat has reached the resistance of resistance 110 plus that of wire 107. Just as the rollers 99 and 100 bridge the gaps between the ends of their respective resistors, roller 101 which has just bridged the gap that it straddles has just broken away to switch one segment of resistance 112 into the circuit. To secure this simultaneous effect, the gaps 115 which separate the ends of all resistors are in line to be bridged simultaneously by the rollers while the remaining gaps in any switch are slightly displaced circularly in one direction from the exact index line in reference to the gap 115 so that they are reached by the roller at a different time than the gaps 115. Thus whenever a main resistor is shorted by a roller bridging a gap 115 a segment of a main resistor of the next highest order is simultaneously introduced into the circuit to maintain an uninterrupted progression.

Although the device as shown is based on a 60° turn, it may be based on a decade interval of 36° if desired. Additional resistances of a progressively higher order may be coupled to those shown in a similar manner.

I claim:

1. A resistor comprising an elongated resistance wire winding, a conductive substance of considerably higher specific resistance than the wire winding covering said winding, the conductive substance varying in conductivity linearly in accordance with but oppositely to the linear resistance inaccuracies of the wire resistor.

2. The method of producing an accurate rheostat consisting in forming an elongated resistor, assembling said resistor into the form of a rheostat including the contactor means therefor and subsequently modifying the conductivity of said resistor variously throughout its length in accordance with but oppositely to the linear resistance inaccuracies of the resistor.

3. The method of producing an accurate rheostat consisting in forming an elongated resistor, assembling the same into the form of a rheostat including contactor means therefor, operating said rheostat by advancing the contactor means along the resistor and producing local variations in the conductivity of the resistor in proximity of the moving point of contact between the contactor and the resistor, said variations being made in accordance with but oppositely to the linear resistance inaccuracies of the resistor.

4. The method of producing an accurate rheostat consisting in forming an elongated resistor, assembling the resistor into the form of a rheostat including the contactor means therefor, operating said rheostat by advancing the contactor along the resistor, simultaneously advancing a cutting means along the resistor in proximity to the point of contact, said cutting means being applied to the resistor whereby the conductivity of the resistor is reduced, the application of the cutting means being modified in accordance with the linear inaccuracies of the resistor but in opposite manner thereto whereby said linear inaccuracies are substantially reduced.

5. The method of increasing the accuracy of a rheostat consisting in recording the linear resistance inaccuracy of the rheostat subsequently, reproducing said record, and modifying the conductivity of the rheostat linearly in accordance with said reproduction whereby the linear resistance inaccuracy of said rheostat is substantially reduced.

6. Apparatus for increasing the accuracy of a rheostat comprising means for producing a record of the linear resistance inaccuracy of a rheostat, and means including record reproducing mechanism for transferring said record to the rheostat in such manner as to modify the conductivity of the rheostat linearly in accordance with the record whereby said linear resistance inaccuracy is substantially reduced.

7. Apparatus for producing an accurate rheostat comprising a support for a rheostat, means for advancing a contactor over the rheostat resistance element, a circuit for said resistance element, means for deriving an electric current from said circuit modulated according to the resistance inaccuracies of the resistance element, means actuating the resistance element for correcting said resistance inaccuracies and means whereby the electric current controls the correcting means directly in accordance with the modulations induced by the resistance inaccuracies to correct the same.

8. The method of producing an accurate rheostat consisting in forming an elongated resistance element, moving a contactor over said resistance element, deriving an electric current modulated according to the linear resistance inaccuracies of the resistance element, and controlling by means of the electric current a correcting means applied to the resistance element whereby the resistance inaccuracies are corrected in accordance with the modulation they impose upon said electric current.

LEON DEWAN.

REFERENCES CITED

The following references are of record in the file of this patent:

UNITED STATES PATENTS

| Number | Name | Date |
|---|---|---|
| Re. 10,944 | Weston | July 17, 1888 |
| 1,859,930 | Miller | May 24, 1932 |
| 1,962,438 | Flanzer et al. | June 12, 1934 |
| 2,366,614 | Hansell | Jan. 2, 1945 |
| 2,412,619 | Kindermann et al. | Dec. 17, 1946 |
| 2,500,605 | De Lange et al. | Mar. 14, 1950 |